United States Patent [19]
Bushman

[11] Patent Number: 5,680,135
[45] Date of Patent: Oct. 21, 1997

[54] RADIATION COMMUNICATION SYSTEM

[75] Inventor: Boyd B. Bushman, Lewisville, Tex.

[73] Assignee: Lockheed Martin Corporation, Fort Worth, Tex.

[21] Appl. No.: 454,281

[22] Filed: Dec. 21, 1989

[51] Int. Cl.⁶ ............................................ H04K 3/00
[52] U.S. Cl. ..................... 342/13; 359/109; 359/180; 250/340; 250/351
[58] Field of Search .................... 342/45, 13; 455/66, 455/106, 600, 91; 367/137; 359/109, 180; 250/351, 340

[56] References Cited

U.S. PATENT DOCUMENTS

| | | | |
|---|---|---|---|
| 3,021,428 | 2/1962 | Mattke et al. | |
| 3,300,721 | 1/1967 | Seaton | 392/45 |
| 3,796,396 | 3/1974 | Crovella | 244/3.14 |
| 3,944,167 | 3/1976 | Figler et al. | 244/3.16 |
| 4,028,544 | 6/1977 | Jourdan et al. | 250/204 |
| 4,148,032 | 4/1979 | Kelly et al. | 342/45 |
| 4,234,145 | 11/1980 | Leiboff | 244/3.16 |
| 4,397,429 | 8/1983 | Fouilloy | 244/3.11 |
| 4,666,103 | 5/1987 | Allen | 244/3.11 |
| 4,773,754 | 9/1988 | Eisele | 356/152 |
| 4,849,620 | 7/1989 | Guerin et al. | 250/203 R |

*Primary Examiner*—Mark Hellner
*Attorney, Agent, or Firm*—James E. Bradley

[57] ABSTRACT

An aircraft has an exhaust flame or plume which can be modulated to communicate. A sound emitter is mounted to the aircraft for emitting acoustic waves into the exhaust plume. An encoder will control the emitter at selected digital sequence to provide a digital message. The flame or plume will radiate at a frequency range of interest depending on the type of aircraft. The sound waves cause the frequencies to change from a continuous spectrum to a spectrum which has a much lower amplitude. A detector remotely located from the aircraft will detect radiation. It filters frequencies outside of the frequency range of interest. It will discriminate between the modulated pattern and the continuous pattern. This output provides the digital code that was encoded by the encoder. A decoder will decode the message for the recipient.

39 Claims, 4 Drawing Sheets

RADIATION COMMUNICATION SYSTEM

CROSS-REFERENCE TO RELATED APPLICATION

An application entitled "Heat Radiation Detection System" by the same inventor is being simultaneously filed with this application.

BACKGROUND OF THE INVENTION

1. Field of the Invention:

This invention relates in general to characteristics of exhaust plume modulation, such as from a jet aircraft, and in particular to means for modulating the exhaust plume to communicate at the speed of light.

2. Description of the Prior Art:

Communications to and from aircraft are handled by radio. There are times when radio communications have disadvantages. It can be monitored by an enemy and will help identify the location of the transmitter. At present, there are no other effective ways to communicate to and from aircraft.

SUMMARY OF THE INVENTION

In this invention, a high intensity sound source will be mounted in proximity to or within the exhaust plume of the aircraft. The exhaust plume radiates within a known frequency range. The radiation frequencies can be detected by various detectors, such as infrared, ultraviolet or a radio receiver. An encoder will modulate the sound source in a selected sequence. This may be done by turning the sound source on and off to create a digital sequence. The modulation can also be by voice, creating an amplitude modulated radiation sequence.

The high amplitude sound source will interact with the exhaust plume and modify the exhaust plume directly proportional to the sequence encoded. A remote detector can detect the radiation from the flame. The modulations encoded by the encoder will be picked up by the detector, as well. A decoder will decode the modulations to deliver the message.

BRIEF DESCRIPTION OF THE DRAWINGS

FIG. 6 illustrates the frequencies monitored when the sound sources of FIG. 4 are turned on.

DETAILED DESCRIPTION OF THE INVENTION

Figure 1:
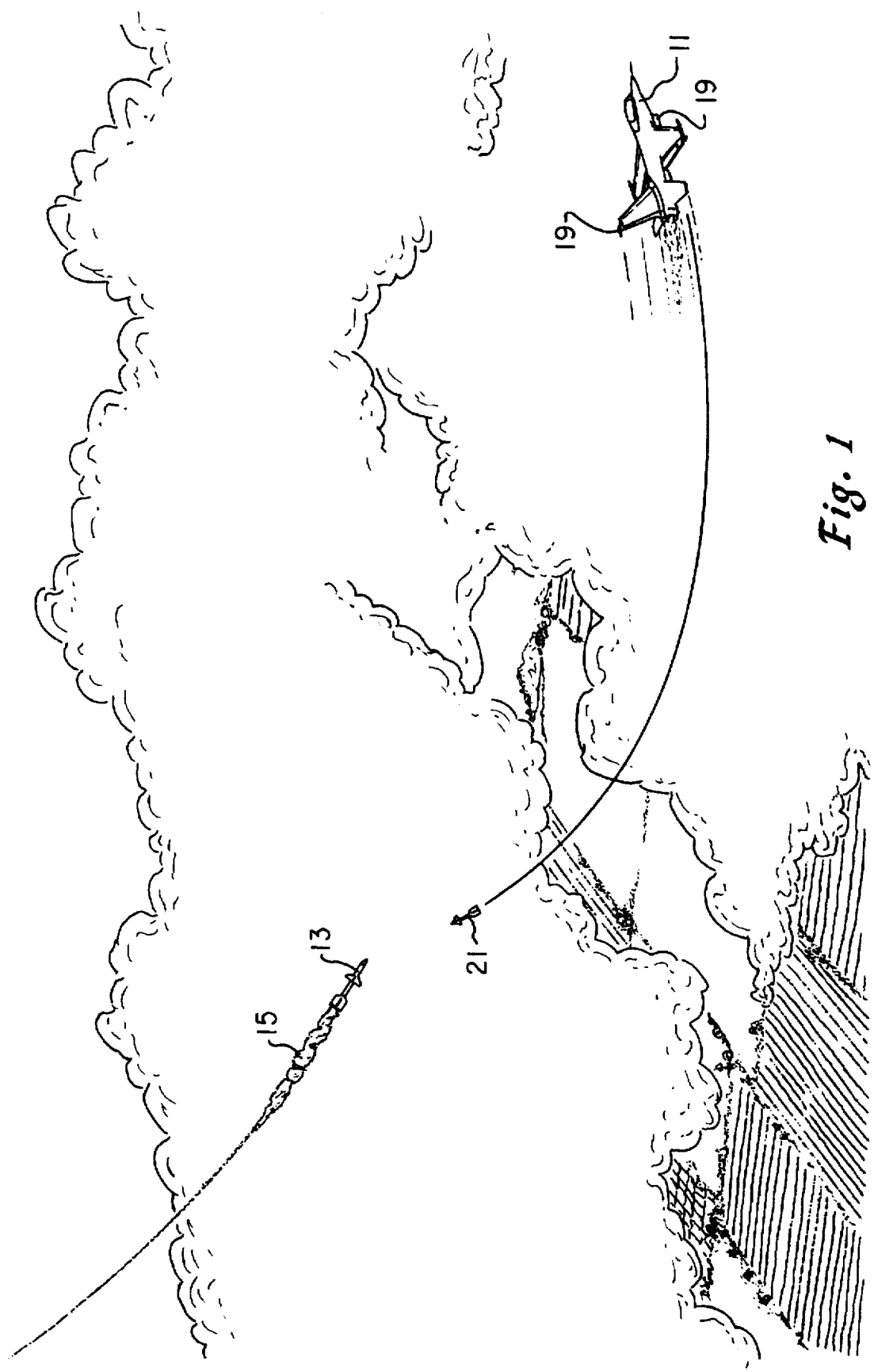
FIG. 1 is a pictorial representation of an aircraft being pursued by a missile.

Referring to FIG. 1, a military jet aircraft 11 is shown being pursued by an attacking missile 13. Missile 13 may either be radar guided or guided by an infrared detector. Missile 13 will be powered by a rocket engine which discharges a hot gaseous plume 15 which modulates. Plume 15 will be considerably larger in diameter than the diameter of the missile 13. In addition, it will stream behind the missile 13 a considerable distance.

Plume 15 is made up of molecules and atoms discharging at high exit velocities from missile 13. The molecules and the atoms will radiate optically and electromagnetically. Radio frequency waves will also radiate, possibly because the plume 15 becomes positively charged as a result of electrons being stripped from the atoms exiting at high velocity. The radiation will radiate in all directions.

Tests have determined that the plume 15 will flicker, similar to the flicker of a flame, but at a much higher rate. This flicker or modulation of the radiation can be detected by detectors 19 on the aircraft 11. Each detector 19 may be an electro-optical detector, such as an infrared detector or an ultraviolet detector. Furthermore, it could be a radio frequency receiver. It may be a combination of all three. Normally there will be several detectors 19 on the aircraft 11 in at least two different locations to observe in all directions.

The detector 19 will detect the modulation of the plume 15, identify it as coming from a missile 13, and provide a warning to the pilot of the aircraft 11. The pilot may take counter measures to avoid being struck by the missile 13. In addition, he may actively attack the missile 13 such as by firing an anti-missile missile 21, laser or particles.

Figure 2:
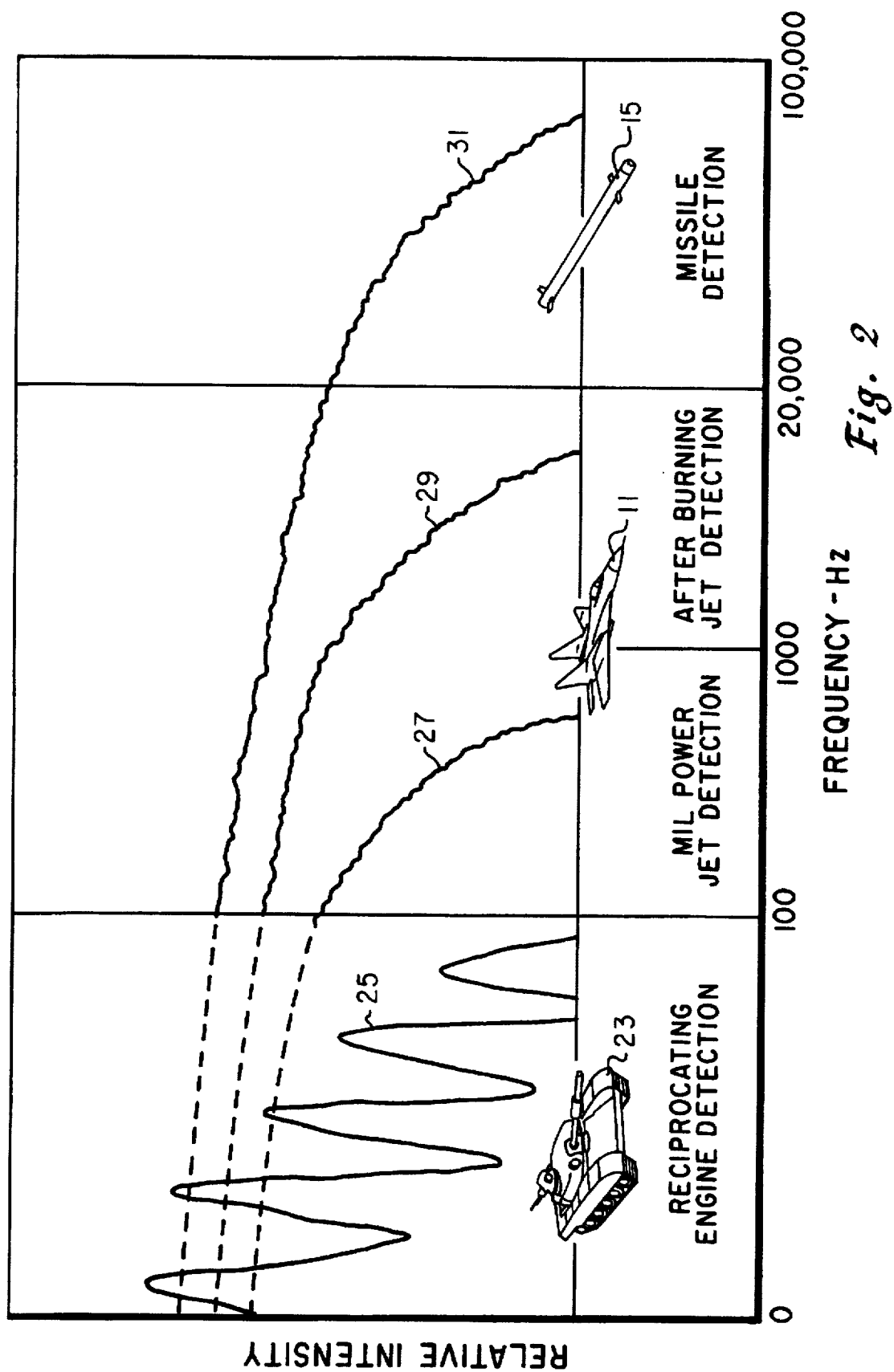
FIG. 2 is a graph illustrating the various radiation frequencies observed from the exhausts of reciprocating engines, military jets, and missiles.

FIG. 2 illustrates the radiation modulation detected by three different self-propelled objects that may be present within the view of the detector 19 (FIG. 1). Tank 23 represents land vehicles which will have internal combustion reciprocating engines. The curve 25 shows the radiation detected by an infrared detector during experiments with reciprocating engines. The maximum modulated frequency of this radiation is less than 100 Hz.

The jet 11 has one curve 27 which represents the frequencies that will be encountered by measuring its exhaust plume during normal military thrust. The curve 27 is obtained by connecting an infrared or ultraviolet detector 19 to a Fast Fourier Transform unit. The fast Fourier Transform unit is a commercially available unit. The one employed is a Hewlett-Packard dynamic signal analyzer. It plots the frequencies encountered versus time. A separate curve at selected intervals will normally be taken, the intervals being ⅛ second apart in order to get a full view for the spectrum of frequencies that will be obtained with time.

These frequencies extend from zero up to somewhat less than 1000 Hz in the case of curve 27. With the after burner, the frequencies become much higher. Under after burner conditions, frequencies will be encountered as high as about 9,000 Hz with the particular jet 11 monitored. Curve 29 shows a frequency spectrum will range from zero to a level less than 10,000 Hz. To account for a safety margin, the frequency range of interest of military jets may be considered to be from about 100 Hz to about 20,000 Hz.

Fortunately for detection, the missile 15 will have frequencies that modulate much higher than 20,000 Hz. Curve 21 shows that frequencies can be encountered from zero up to about 80,000 Hz. The frequency range of interest for a missile can be considered to be from about 20,000 Hz to about 80,000 Hz, or if desired, the upper limit could be increased to 100,000 Hz. The missile detection system can filter out any radiation which has frequencies only below 20,000 Hz, thus identifying to the detector that a missile 13 has been launched.

Similarly, if it is desired to detect jet airplanes, signals which have frequencies below 1000 Hz and those which have frequencies above 20,000 Hz could be filtered out. Furthermore, if it is desired to detect a ground reciprocating engine vehicle, signals with frequencies above 100 Hz could be filtered out.

There are other sources of radiation that will be detected by the detector 19. Background radiation such as from hills, sky, clouds, etc. do not move or modulate in the region of interest. Battle field flares and aircraft flares provide radiation modulation. However, their modulation is lower frequency than the range of interest for a missile. Fires are only about 50 Hz. Flares may be up to about 2,000 Hz. Sun flares can be as high as about 2,000 Hz, as well, still far below the region of interest for missiles.

Lightning causes short high frequency bursts above 100,000 Hz. These can be filtered from the missile region of interest, which is about 20,000 Hz to 80,000 Hz. Also, tests have determined that lightning lasts no more than 1/16 of a second. Consequently, the detector system can also have a time delay which blocks signals from radiation that last less than about 1/4 of a second.

Figure 3:
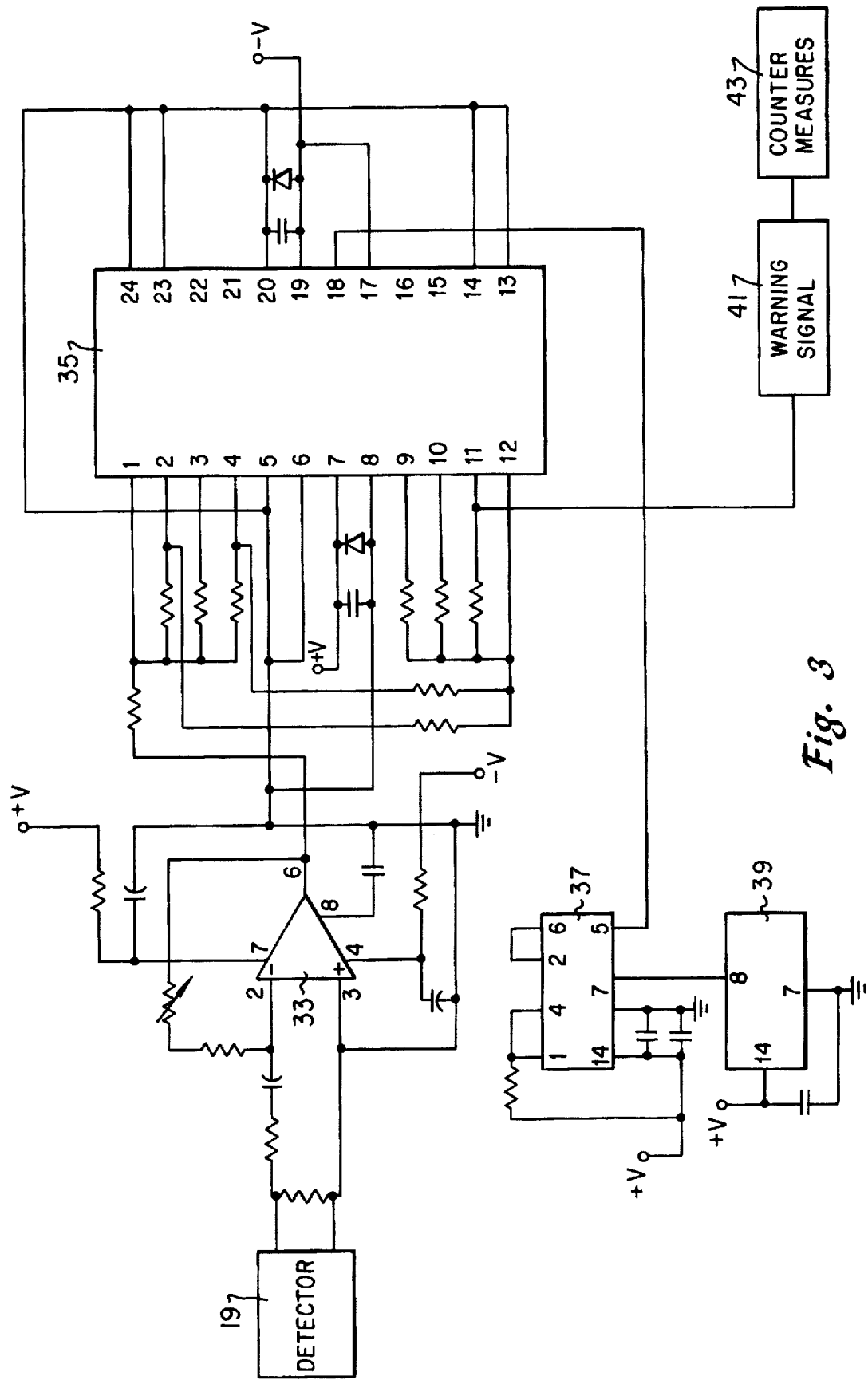
FIG. 3 is an electrical schematic view illustrating a flame detection system.

FIG. 3 illustrates more details of the detector system. Detector 19, as mentioned, can be of various types. One suitable infrared detector is a cryogenically cooled indium antimonide infrared detector. It must be cooled to about 80 degrees Kelvin. Liquid nitrogen may be employed to cool the detector 19 if it is an infrared detector.

The infrared detector 19 can be exchanged for a room temperature visible and/or ultraviolet detector, such as a silicon detector. The silicon detector measures both the visible and the ultraviolet light waves. Detector 19 may also be a radio receiver, which will also detect radiation from the plume 15. In one test, the radio receiver carrier frequency was swept between 100 and 600 kHz. Low frequency modulations as shown in FIG. 2 were detected at all of these radio receiver carrier frequencies.

Referring still to FIG. 3, the detector 19 will be connected to a conventional preamplifier 33. Preamplifier 33 will have associated circuitry as shown. The output from the preamplifier 33 leads to an electronic sweeping filter 35. Filter 35 may be a conventional electronic filter, which will be connected conventionally with its associated circuitry as shown. One type employed is an LTC 1064 integrated circuit. Filter 35 is driven by a timing circuit comprising the integrated circuits 37, 39. The circuits 37, 39 are respectively an SN 7474 and an XO Bomar 994-1035, 4 MHz. In the alternative, filter 35 may be driven by a standard frequency varying input.

Filter 35 upon receiving an output from the preamplifier 33, will sweep frequencies across with time. Filter 35 will be set to discriminate so that it will provide an output only if it receives a signal having frequencies greater than 20,000 Hz and no more than 80,000 Hz. The range of interest could be increased to about 10,000 Hz to 100,000 Hz if desired..

The output of the filter 35 will be a DC signal which leads to a warning signal circuit 41. The warning signal circuit 41 may be a light or an audible signal. The warning signal circuit 41 may be connected to an automatic counter measure circuit 43. Alternatively, the pilot may take control of counter measures himself. The counter measure circuit 43 could undertake automated counter measures such as ejecting flares and metal chaff or maneuvering the aircraft 11. Furthermore, the counter measure circuit 43 could fire the anti-missile missile 21, as illustrated in FIG. 1, or a laser or particle beam.

In operation of the embodiment of FIGS. 1-3, detector 19 will monitor for any radiation in the desired frequency range. The distance range will be many miles. The distance range is inversely proportional to the square root of the frequency band width. The low frequency band width of 20,000 Hz to 80,000 Hz is small, resulting in a large detection range.

Any radiation picked up by detector 19 will pass through the preamplifier 33 into the electronic filter 35. If the frequencies from the detected radiation are less than 20,000 Hz or exceed 80,000 Hz, then no warning signal will be provided by the circuit 41. On the other hand, if the signal has frequencies between 20,000 and 80,000 Hz and none higher than 80,000 Hz, then the filter 35 will provide an output to the warning signal circuit 41. The warning signal circuit 41 will provide a warning to the pilot or automatically counter the missile. Counter measures will be taken to avoid attack by the missile 13.

FIGS. 4-7 illustrate a modification or further extension of the system described in FIGS. 1-3. Jet 45 has mounted to its vertical stabilizer two acoustic wave sources 47. Sources 47 are capable of delivering high amplitude sound waves of selected frequencies. The sound source 47 may be a loud speaker, an air whistle, or an air pipe. Preferably, they should be able to deliver sound waves of an intensity substantially equal to the sound intensity of plume 49 at its normal power level. This level is about 100 decibels for military thrust. The sound sources 47 are directed downward and rearward to emit sound waves directly into the plume 49. A sound source 47 could alternatively be mounted within the jet flame or plume 49.

Figure 5:
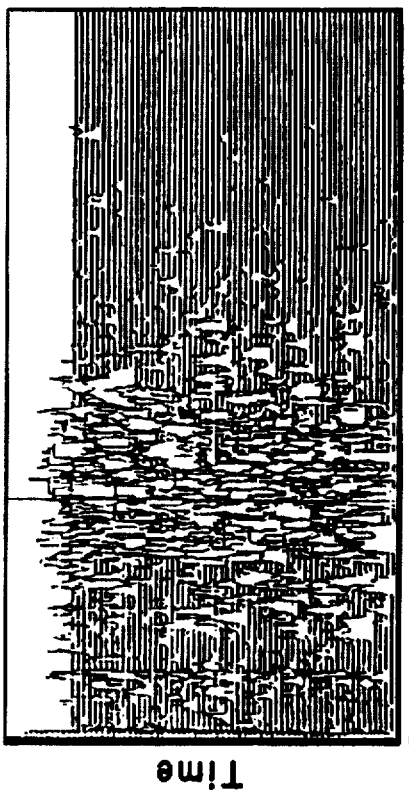
FIG. 5 is a graph illustrating the various frequencies monitored of radiation from an exhaust plume of the aircraft of FIG. 4 when the sound sources of FIG. 4 are inactive.

FIG. 5 illustrates the frequencies encountered by the radiation from plume 49 when the jet 45 is at its normal military thrust level. These radiations may be measured as described previously in connection with the embodiments of FIGS. 1-3. They may be detected by an infrared or ultraviolet detector or by a radio frequency receiver. The frequencies found run from zero to somewhat less than 2,000 in this case. The graph of FIG. 5 illustrates an actual test utilizing an ultraviolet detector and an F-16 aircraft 45.

Figure 6:
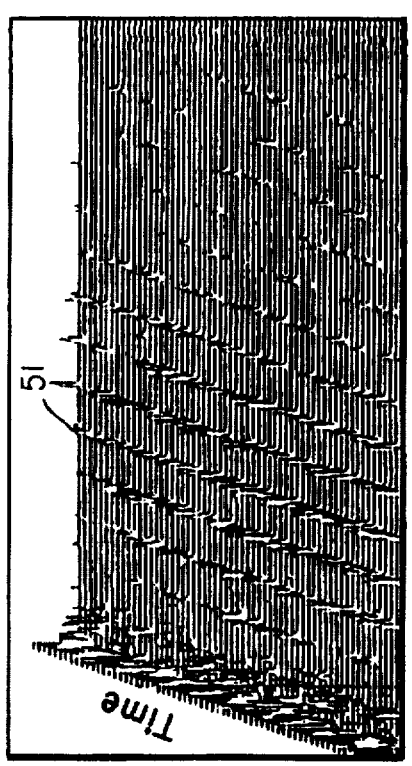
Figure 4:
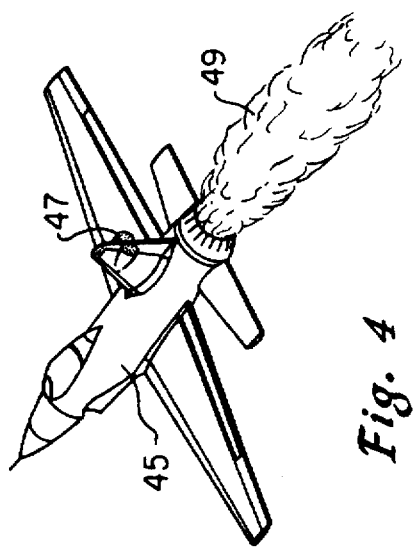
FIG. 4 is a perspective view illustrating an airplane having sound sources mounted to it in accordance with this invention.

FIG. 6 illustrates what occurs when the sound sources 47 are delivering the high energy sound into the plume 49. The pattern changes dramatically from that shown in FIG. 5. Harmonics 51 at various regularly spaced apart frequencies occur which can be readily detected. FIG. 6 represents the sound sources 47 continuously on. The operators of the test swept the frequencies of the sound source between 100 and 700 Hz (Hertz) during the test. The harmonic pattern as shown in FIG. 6 occurred at all of the frequencies between 100 and 700 Hz. However, the harmonics did not exist below 100 Hz nor above 700 Hz. The curves of FIG. 5 and FIG. 6 were produced by connecting the output of an ultraviolet detector to a Fast Fourier Transform Hewlett Packard dynamic signal analyzer.

In addition, the radiation frequencies detected while the sound sources 47 were on had far less amplitude than when the sources 47 were off. This difference in amplitude is easily detectable. It allows voice to be communicated by analog amplitude modulation. It also allows digital communication to take place.

Turning the sound sources 47 on and off would alternately produce the pattern shown in FIG. 5 and that shown in FIG. 6. Encoding the on and off sequences rapidly in a digital form will provide a digital message for communication because the pattern of FIG. 6 has much lower amplitude than the pattern of FIG. 5.

Figure 7:
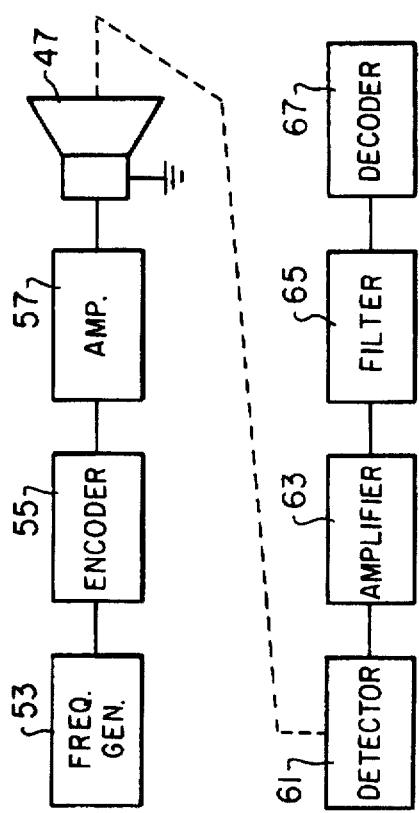
FIG. 7 is a block diagram illustrating the components of the system of this invention.

As shown in FIG. 7, the system preferably includes a frequency generator 53 which will be used to either sweep frequencies or to select a desired frequency region. A frequency generator drives an encoder 55 which controls an amplifier 57. The encoder 55 turns the amplifier 57 on and off in the desired digital sequence. The amplifier 57 drives the sound sources 47.

At a remote location, such as on another aircraft, a detector 61 will pick up the radiations from the plume 49. Detector 61 may be of the same type as detector 19 of FIGS. 1–3. In the graphs of FIGS. 5 and 6, it was an ultraviolet detector. The detector 61 output leads to an amplifier 63 and a filter 65. The filter 65 serves to eliminate background noise and also serves to detect the differences in amplitude that occur when the sound sources 47 are on and off. The filter 65 and the amplifier 63 may be similar to the preamplifier 33 and filter 35 of FIG. 3. In this case, the frequency range of interest will be between 10 Hz and 10,000 Hz, which is the range for a plume 49 of a jet 45.

The output of the filter 65 may either be digital or analog with amplitude modulations on a carrier wave. The output will lead to a decoder 67, which may be a digital decoder. If the sound sources 47 were amplitude modulated by voice, the decoder 67 would comprise an amplifier and speaker system for voice. The decoder 67 will decode and translate the message for the recipient.

In the operation of the embodiment of FIGS. 4–7, should the pilot wish to communicate using the exhaust plume 49, he will actuate the sound sources 47. The frequency generator 53 will drive the sound sources 47 and the encoder 55 will modulate the amplifier 57 with the desired message. Preferably, this modulation is performed by turning the amplifier 57 on and off in a digital code.

At the remote location, the detector 61 will detect the radiation from the plume 49. This radiation will be modulated according to the encoder 55. The detector 61, amplifier 63 and filter 65 will discriminate from other radiations received. The filter 65 will provide a digital output based on the amplitude differences between the harmonic distribution shown in FIG. 6 and the random distribution shown in FIG. 5. Decoder 67 will decode the digital output from the filter 65 and provide a message for the recipient.

The system has significant advantages. Two different jets can communicate with each other using the jet flames or plumes. A missile can be guided from the jet flame of an aircraft if the missile is equipped with a detector, filter and decoder. Computer data can be transferred from one flame to another source. The encoding can provide information which can improve or diminish the flame's rate of burn. The flame of one aircraft can be used to improve or modify another flame of another aircraft or missile by resonant transfer.

While the invention has been shown in only two of its forms, it should be apparent to those skilled in the art that it is not so limited, but is susceptible to various changes without departing from the scope of the invention.

I claim:

1. In an aircraft which creates a hot exhaust plume which emits radiation, a communication system comprising:

emitter means mounted in association with the aircraft for emitting acoustic waves into the exhaust plume to modulate the radiation of the plume;

encoding means for modulating the emitter means in a selected sequence containing a message;

detector means remotely located from the aircraft for detecting the radiation created by the exhaust plume, and for creating an electrical output corresponding to the modulated radiation; and decoder means for decoding the output of the detector means to determine the message.

2. The apparatus according to claim 1 wherein the detector means optically detects the radiation.

3. The apparatus according to claim 1 wherein the detector means is an infrared detector.

4. The apparatus according to claim 1 wherein the detector means is an ultraviolet detector.

5. The apparatus according to claim 1 wherein the detector means is a radio frequency receiver.

6. The apparatus according to claim 1 wherein the encoding means modulates in a digital sequence.

7. The apparatus according to claim 1 wherein the encoding means emits voice sound to modulate the plume in an analog manner.

8. The apparatus according to claim 1 wherein the emitter means comprises a sound source mounted to the rear of the aircraft.

9. In an aircraft which creates a hot exhaust plume which emits light radiation which has a frequency range of interest, comprising:

emitter means mounted to the aircraft for emitting acoustic waves into the exhaust plume to modulate the radiation of the plume;

encoding means for turning the emitter means on and off in a selected digital sequence containing a message;

optical detector means remotely located from the aircraft for detecting the radiation created by the exhaust plume, and for creating an electrical output signal having frequencies corresponding to the modulated frequencies of the light radiation;

means for filtering from the output signal frequencies outside of the frequency range of interest and for creating a digital output in said digital sequence if frequencies from the frequency range of interest are detected; and decoder means for decoding said digital output to determine the message.

10. The apparatus according to claim 9 wherein the detector means is an infrared detector.

11. The apparatus according to claim 9 wherein the detector means is an ultraviolet detector.

12. The apparatus according to claim 9 wherein the frequency range of interest is from substantially 10 Hz to 10,000 Hz.

13. A method for communicating with an aircraft which creates a hot exhaust plume, comprising:

mounting an acoustic emitter to the aircraft and emitting acoustic waves into the exhaust plume;

modulating the emitter in a selected sequence to encode a message;

locating a detector remote from the aircraft and detecting the radiation created by the exhaust plume;

creating an electrical output from the detector corresponding to the modulated radiation; and decoding the output of the detector to determine the message.

14. The method according to claim 13 wherein the step of detecting includes optically detecting the radiation.

15. The method according to claim 13 wherein the step of detecting includes optically detecting the radiation with an infrared detector.

16. The method according to claim 13 wherein the step of detecting includes optically detecting the radiation with an ultraviolet detector.

17. The method according to claim 13 wherein the step of detecting includes detecting the radiation with a radio frequency receiver.

18. The method according to claim 13 wherein the emitter means is modulated in a digital code.

19. The method according to claim 13 wherein the emitter means is analog including voice modulated.

20. A method for communicating with an aircraft which creates a hot exhaust plume, comprising:

determining a frequency range of interest at which light radiation emits in exhaust plumes of aircraft;

mounting an acoustic emitter to the aircraft and emitting acoustic waves into the exhaust plume to modulate the radiation of the exhaust plume;

turning the emitter on and off in a selected digital sequence to encode a message;

locating an optical detector remote from the aircraft and detecting the light radiation created by the exhaust plume;

providing an electrical output signal from the detector having frequencies corresponding to the modulated frequencies of the light radiation;

filtering from the output signal frequencies outside of the frequency range of interest;

creating a digital output based on the modulated radiation detected if frequencies from the frequency range of interest are detected; and decoding the digital output to determine the message.

21. The method according to claim 20 wherein the step of detecting includes optically detecting the radiation with an infrared detector.

22. The method according to claim 20 wherein the step of detecting includes optically detecting the radiation with an ultraviolet detector.

23. The method according to claim 20 wherein the frequency range of interest determined is from substantially 10 Hz to 10,000 Hz.

24. The method according to claim 20 wherein the step of determining said frequency range of interest is performed by the following steps:

detecting the radiation of exhaust plumes of various self-propelled objects including aircraft likely to be encountered; and creating electrical output signals corresponding to the modulated frequencies of the radiation detected to determine the frequencies generated by the various self-propelled objects likely to be encountered.

25. In an aircraft which creates a hot exhaust plume which emits radiation, a communication transmitter comprising:

emitter means mounted in association with the aircraft for emitting acoustic waves into the exhaust plume to modulate the radiation of the plume; and encoding means for modulating the emitter means in a selected sequence containing a message, so that the message can be remotely detected and decoded.

26. The aircraft according to claim 25 wherein the acoustic waves emitted into the exhaust plume have frequencies in the range from 100 to 700 HZ.

27. The aircraft according to claim 25 wherein the exhaust plume has an amplitude intensity at normal power level, and wherein the amplitude intensity of the acoustic waves emitted by the emitter means is substantially equal to the amplitude intensity of the exhaust plume at normal power level.

28. The aircraft according to claim 1 wherein the acoustic waves emitted into the exhaust plume have frequencies in the range from 100 to 700 HZ.

29. The aircraft according to claim 1 wherein the exhaust plume has an amplitude intensity at normal power level, and wherein the amplitude intensity of the acoustic waves emitted by the emitter means is substantially equal to the amplitude intensity of the exhaust plume at normal power level.

30. The aircraft according to claim 9 wherein the acoustic waves emitted into the exhaust plume have frequencies in the range from 100 to 700 HZ.

31. The aircraft according to claim 9 wherein the exhaust plume has an amplitude intensity at normal power level, and wherein the amplitude intensity of the acoustic waves emitted by the emitter means is substantially equal to the amplitude intensity of the exhaust plume at normal power level.

32. The method according to claim 20 wherein the step of emitting acoustic waves emits acoustic waves with frequencies in the range from 100 to 700 HZ.

33. The method according to claim 20 wherein the step of emitting acoustic waves emits acoustic waves which have an amplitude intensity substantially equal to the amplitude intensity of the exhaust plume at normal power level.

34. In an aircraft which creates a hot exhaust plume which emits radiation which has a frequency range of interest, comprising:

emitter means mounted to the aircraft for emitting acoustic waves into the exhaust plume to modulate the radiation of the plume; and encoding means for turning the emitter means on and off in a selected digital sequence containing a message so that the message can be remotely detected and decoded.

35. The aircraft according to claim 34 wherein the acoustic waves emitted into the exhaust plume have frequencies in the range from 100 to 700 HZ.

36. The aircraft according to claim 35 wherein the exhaust plume has an amplitude intensity at normal power level, and wherein the amplitude intensity of the sound waves emitted by the emitter means is substantially equal to the amplitude intensity of the exhaust plume at normal power level.

37. A method for communicating by means of an apparatus which creates a hot exhaust plume, comprising:

positioning an acoustic emitter in association with the apparatus and impressing acoustic waves upon the exhaust plume; and modulating the impressed acoustic waves in a selected sequence to encode a message so that the message can be remotely detected from the apparatus by detecting radiation from the plume.

38. The method according to claim 37 wherein the step of impressing acoustic waves upon the plume impresses acoustic waves with frequencies in the range from 100 to 700 HZ.

39. The method according to claim 37 wherein the step of impressing acoustic waves upon the plume impresses acoustic waves which have an amplitude intensity substantially equal to the amplitude intensity of the plume.

* * * * *